Figure 1:
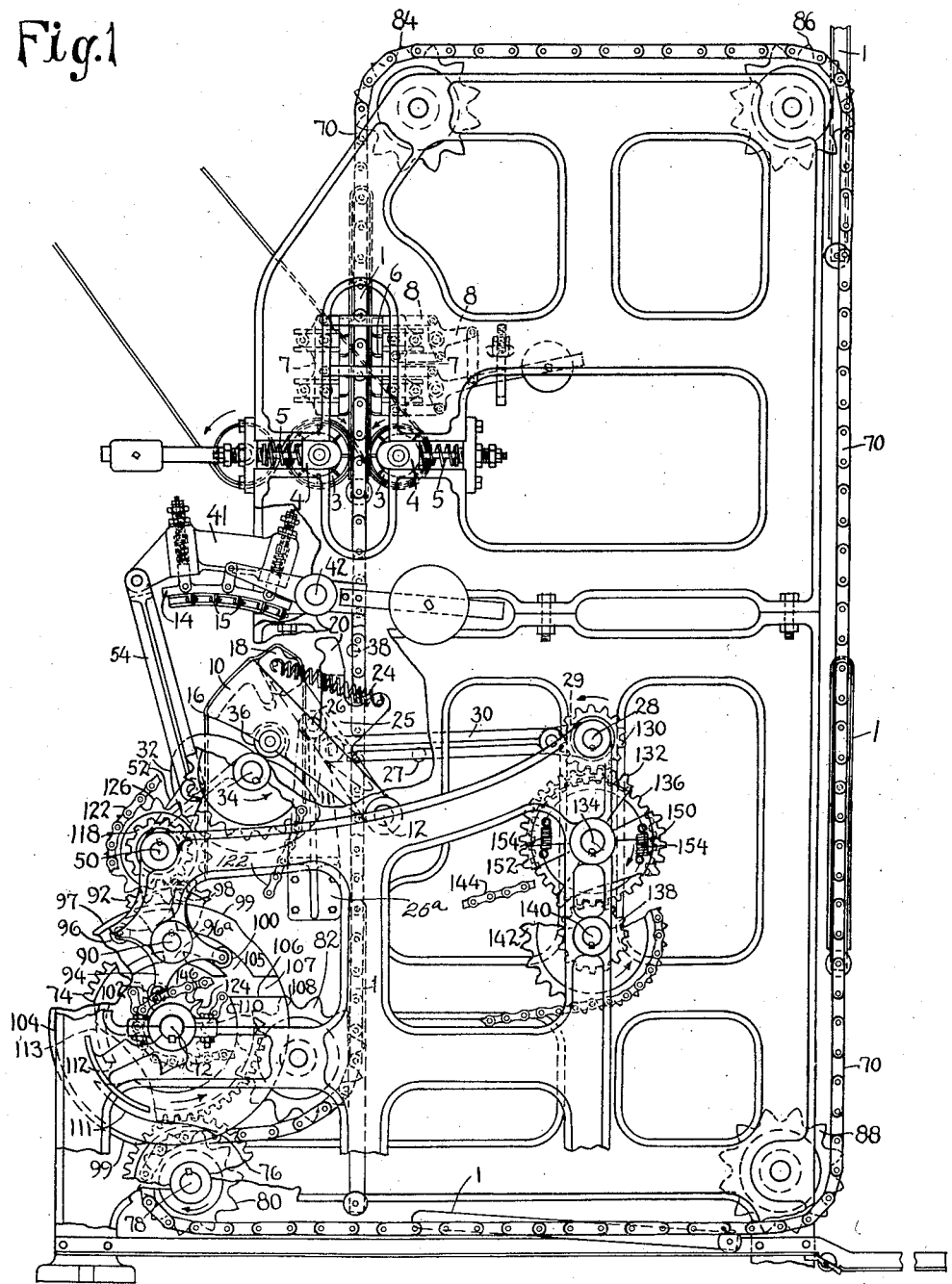

Dec. 15, 1936.  H. A. BALLARD  2,063,974
MACHINE FOR OPERATING UPON HIDES, SKINS, AND PIECES OF LEATHER
Filed Jan. 10, 1935  2 Sheets-Sheet 1

Inventor.
Harris A. Ballard
By his Attorney
Harlow M. Davis

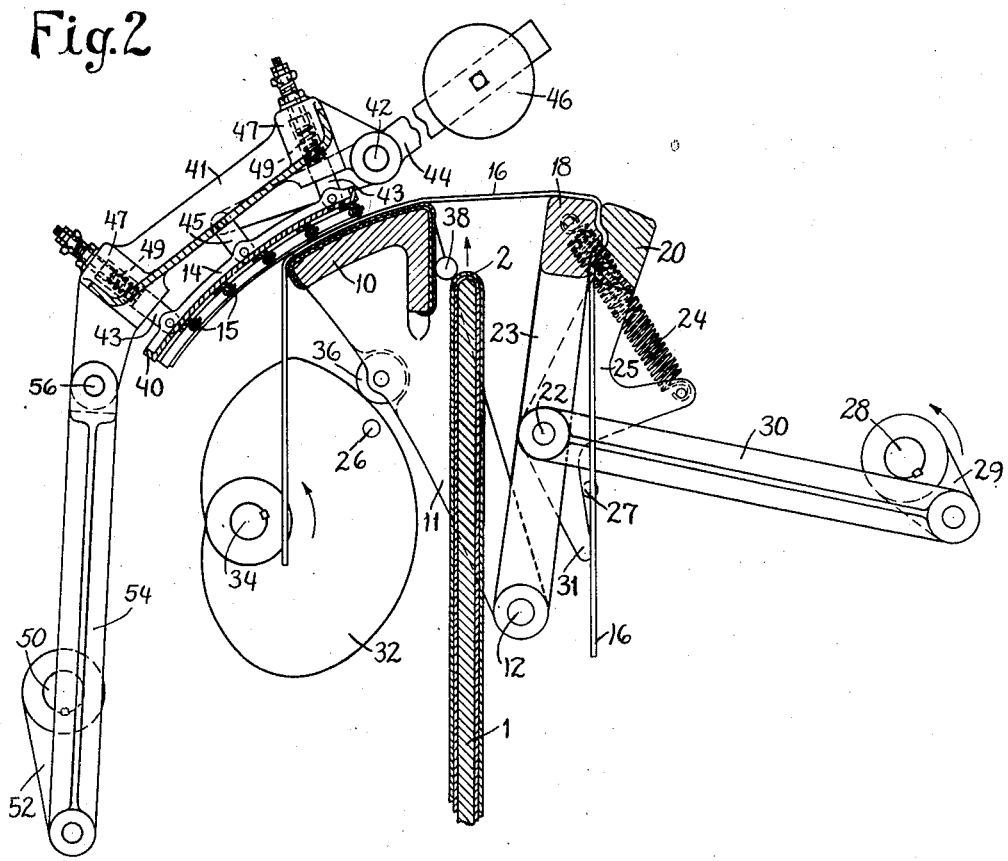

Patented Dec. 15, 1936

2,063,974

UNITED STATES PATENT OFFICE 2,063,974

MACHINE FOR OPERATING UPON HIDES, SKINS, AND PIECES OF LEATHER

Harrie A. Ballard, Beverly, Mass., assignor to The Turner Tanning Machinery Company, Portland, Maine, a corporation of Maine Application January 10, 1935, Serial No. 1,209

27 Claims. (Cl. 149—8)

This invention relates to machines for operating upon hides, skins, and pieces of leather. While the invention is illustrated as embodied in a machine especially adapted to putting-out operations upon hides and skins it is to be understood that the invention and various important features thereof may have other applications and uses.

One of the most efficient of the various types of putting out machines now in commercial use is that commonly known as the serial table putting-out machine which comprises characteristically a plurality of tables carried, by an endless conveyor, in properly spaced relation to each other and movable, in the operative portion of their path of travel, in an upward direction during which each table in turn carries a piece of work between and past bladed cylinders and/or bladed bed members arranged to operate upon the piece of work where it is backed by the oppositely facing surfaces of the upwardly moving table. Commonly that portion of each piece of work which rests over the upper curved edge of the table between the oppositely directed faces thereof is not operated upon by the bladed cylinders or bladed bed members so that special provision has to be made for operating upon that portion of the piece of work resting on the curved edge of the table. It is an object of this invention to provide improved means for insuring that all portions of each piece of work will be operated upon in a thoroughly efficient manner during movement of the piece of work through a machine of the type described. It is a further object of the invention to provide an improved machine of general utility in performing operations upon hides, skins, and leather which will be simple and durable in construction and especially efficient for the purpose intended.

To these ends and in accordance with an important feature of the invention there is provided, in the illustrated construction, a bladed bed member and a work support constructed and arranged to operate upon a central longitudinal portion of a hide or skin and to position the portion of the work thus treated for engagement by a curved edge portion of a table moving to present the work to other work treating means. By this arrangement a longitudinally extending central portion of a hide or skin is treated by elements which are designed to perform the desired operation most effectively, it being a well-known fact that a bladed bed member in co-operation with a suitable work supporting surface is capable of performing the highest grade work of any of the bladed elements commonly employed for the purpose. By having the treated piece of work left in proper position to be engaged by the curved edge portion of a traveling table, each piece of work is subsequently carried between other bladed members to complete treatment of other portions of the work while the latter are backed by oppositely facing surfaces of the table.

In the illustrated construction, there is provided a gripper operative to take hold of a piece of work and move it over the surface of the work support at the same time that the work support is moving relatively to the bladed bed member, the result being that the blades are caused to act in a most efficient way on the work since the latter is maintained under tension during treatment by the blades, the gripper member having the additional function of positioning the portion of the work thus treated for engagement by an upwardly moving table by which the work is carried for completion of the treatment between other instrumentalities provided for the purpose.

These and other important features of the invention and novel combinations of parts will now be described in detail in the specification and then pointed out more particularly in the appended claims.

This application is filed as a continuation in part, and as a substitute for, application Serial No. 667,563, filed June 26, 1933, in the name of Harrie A. Ballard, for Machines for operating upon hides, skins, and pieces of leather.

In the drawings,

Fig. 1 is a view in end elevation, with parts broken away, of a machine illustrating one embodiment of the invention; and Fig. 2 is a detail view, partly in section, of work treating elements showing them in a different position from that disclosed in Fig. 1.

In the illustrated machine, which is specially designed to perform putting-out operations upon hides and skins, there is provided a plurality of tables 1 each having a covering of felt and leather and each having an upper curved edge portion 2 (Fig. 2) and oppositely facing parallel surfaces so that a hide or skin, such as that shown upon the upper table in Fig. 1 of the drawings, may be folded along its backbone portion and have said portion resting upon said curved edge portion of the table with each half of the piece of work backed by one of the plane surfaces of the table. It will be understood that the tables 1 are carried by a conveyor mechanism, hereinafter described, by which each table in turn is caused to move upwardly between a pair of bladed cylinders 3 each carried by blocks one of which is shown at 4 as slidably mounted in slots or guideways in the machine frame, springs 5 being provided for holding the blocks and the bladed cylinders yieldingly toward each other in position to operate upon the piece of work on the table 1. After passing the cylinders 3 the work is operated upon by blades 6 carried by two bed or plate members 7, these bed members 7 being also yieldingly held toward each other by means of sets of weighted levers such as those shown at 8. For a more complete disclosure of a machine of the serial table type reference may be had to United States Letters Patent No. 791,006, granted May 30, 1905 upon an application filed in the name of E. E. Chain.

In the illustrated machine, there is provided a work support 10, carried by swing arms one of which is shown at 11, pivoted in the frame of the machine at 12 so that the work support 10 may swing into the work receiving position shown in Fig. 1 and be subsequently movable in the reverse direction while co-operating with a bed or plate member 14, having blades 15, in performing a putting-out operation on a piece of work 16.

As illustrated, the work support 10 has associated therewith a gripper member 18. For co-operation with the gripper member 18, of a work gripping means, there is provided a co-operating gripper member 20 pivoted upon a shaft 22 mounted in arm supports 23 of the gripper member 18, the gripper member 20 being constantly urged into gripping relation to the gripper member 18 by springs one of which is shown at 24. When the work support 10 with the gripping means moves toward work receiving position, arm portions 25 of the movable gripper member 20 encounter a pair of stops mounted on the frame of the machine at opposite ends of the work support, one of the stops being shown at 26, which operate to hold the movable gripper member 20 from completing its movement with the other gripper member 18, the result being that the gripping means is opened to permit introduction of a fresh piece of work while the work support 10 and the gripping means 18, 20 are in work receiving position shown in Fig. 1. Conveniently, the stop 26 is supported by a bracket 26a (Fig. 1) secured to the inside surface of the frame member at that end of the machine. The said bracket 26a has the greater part of its length offset from the supporting frame in such manner that it extends upwardly between the arm 11 and cam 32, which are on the outer side of said bracket, and arm supports 23 and 25 on the inner side of said bracket, with the pin 26 projecting into the path of the arm 25. As the work support 10 and the gripping means comprising gripper members 18 and 20 move toward the right from the position shown in Fig. 1, finger members 31 of the arm portions 25 of the movable gripper member 20 finally encounter another pair of stops, one of which is shown at 27, which operate to move the gripper member 20 to open position to release the piece of work which has just been operated upon. For oscillating the gripping means 18, 20 there is provided, in the illustrated construction, a shaft 28 journaled in the end frames of the machine and carrying a pair of cranks, one of which is shown at 29, the said cranks each having pivoted thereto a link or pitman 30, the other end of which is pivotally mounted upon the shaft 22 carried by the gripper arms 23. As the shaft 28 rotates in a counterclockwise direction it moves the gripper members 18, 20 into work receiving position with the gripper members spaced from each other as shown in Fig. 1. For moving the work support 10 and also the gripping means in the opposite direction there is provided a pair of cams, one of which is shown at 32, rigidly mounted upon a shaft 34, each cam 32 being in contact with an idler roll 36 carried by the corresponding swing arm 11 of the work support 10. It will be understood that rotation of the cams 32 causes movement of the work support 10 and of the gripper means 18, 20 to the right in Figs. 1 and 2, during which the piece of work 16 backed by the work support 10 is operated upon by the blades of the bladed member 14. Shortly after the work support has started its movement to the right in Figs. 1 and 2, the gripping means, comprising gripper members 18 and 20, are moved away from the work support 10 to drag the work over the arcuate surface of the work support 10, this movement of the gripping means being accomplished by the pitmans 30 operated by the shaft 28. Preferably and as shown, a stop 38 (Fig. 2) is mounted upon the machine frame at each end of the work support 10, the said stop 38 being in the vertical plane defined by the upwardly traveling table 1 and projecting inwardly just far enough to engage the adjacent arm 11 of the table 10 to limit the movement of the latter toward the right (Fig. 2). As before stated, the gripping means is opened to release the work when the fingers 31 of the arms 25 of the gripper member 20 encounter the stops 27. The gripper means moves across the path of the ascending table 1 before the stops 27 are encountered. Hence the treated portion of the work is positioned in the path of the ascending table to be carried upwardly thereby for completion of the treatment of the work.

As illustrated the bladed bed or plate member 14 comprises a relatively heavy and rigid bed member 40 having its concave surface struck on an arc whose center is the axis of the shaft 12 so that the operative edges of the blades 15 may define a cylindrical surface concentric with respect to the arcuate work supporting surface of the work support 10. As shown, the bladed member 14 is yieldingly mounted upon a carrier 41 pivoted upon a shaft 42 carried by the end frames of the machine. A pair of spaced arms, one of which is shown at 44, are each connected by a link 45 to the bed member 40 and are arranged to project beyond the shaft 42 and to carry each a weight 46 to counterbalance the weight of the bed member 40. Pivotally connected to the rectangular bed member 40 at each corner thereof is a rod 43 which is slidable in a well-known way in a socket 47 in the carrier 41, a spring 49 being provided in the socket 47 to yieldingly back the bladed member 14 so that the latter may yield to accommodate variations in the thickness of the work.

For moving the bladed member 14 between work receiving and work operating positions there is provided a shaft 50 journaled in the frame of the machine and carrying at each end thereof a crank member 52 to which is pivoted a pitman 54 the upper end of which is pivotally connected at 56 to the carrier 41 of the bladed member 14. It will be understood that the construction and arrangement of the pitman 54 of Figs. 1 and 2 are duplicated at the other end of the machine and that the purpose of the structure just described is to move the bladed member 14 alternately into spaced relation with respect to the work support 10 and into co-operative relation with respect thereto.

Preferably and as shown, power means is provided for operating the work support 10, the bladed member 14, and the clamp members 18 and 20 in properly timed relation to each other and to the tables 1 carried by endless chain conveyors 70, which pass in an upward direction between the arms 11 of the work support 10 and the arms 23, 25 of the work clamping means. The said power means comprises a shaft 72 journaled at its ends in the end frames of the machine and adapted to be driven from any suitable source of power, the said shaft 72 having fixedly secured thereto at each end a gear wheel 74 arranged in mesh with a pinion 76 each secured to a stub shaft 78 mounted in suitable bearings in the frame of the machine. In this connection it is to be understood that the stub shafts 78 are spaced from each other and do not interfere with the passage of the tables 1 which are pivotally carried by the conveyor chains 70 at each end of the machine. At this point it should be stated that most of the various elements of the power means shown in Fig. 1 are duplicated at the other end of the machine, and hence that the description of these elements applies also to duplicate parts at the other end of the machine except where otherwise specified. After passing around a sprocket wheel 80 fixed on the shaft 78, the conveyor chain 70 engages with an idler sprocket wheel 82 and thence passes upwardly in a vertical plane to an idler sprocket wheel 84 at the top of the machine frame and thence to other sprocket wheels 86 and 88, the driving power for the conveyor chains 70 being furnished by sprocket wheels 80 on the stub shafts 78. Fixedly carried by a stub shaft 90 is a gear wheel 92 and also a cam roll member 94 somewhat rectangular in shape and provided with four cam rolls 96, 98, 100, and 102 one at each corner thereof. It will be observed that the shaft 72 carries fixedly secured thereto a cam plate or disk 104. Referring now to Fig. 1 of the drawings, it will be observed that the cam roll 96 is engaged with the inside concentric surface of a flange 97 on the disk 104, the cam roll 98 is engaged with a cam rim 99 on the cam disk 104, that cam roll 100 is in a slot 105 in the disk 104, while the cam roll 102 is floating in a clearance space about the hub of the disk 104. Upon rotating the disk 104 in a counterclockwise direction, as indicated by the arrow, the cam roll 100 encounters a plane surface 106 in a slot 107 and is thereby directed outwardly ultimately to engage an outer concentric rim surface 108 on the disk 104. At the same time that roll 100 moves in the direction to engage the surface 108, the roll 96 moves through slot 96ᵃ, cam roll 98 moves to engage the concentric rim surface 108, and the cam roll 102 engages surface 110, whereby the rectangular spider member 94 has been caused to rotate sufficiently to complete one quarter rotation of the shaft 90, thereby bringing the bladed member 14 downwardly into contact with the work 16 on the auxiliary work support 10. The rectangular member 94 is locked in the described position to hold the bladed member 14 in operative position while the work support 10 is rocked in a clockwise direction, thus effecting treatment of that portion of the work resting upon the work support 10. Continuation of the rotation of the cam plate or disk 104 in a counterclockwise direction results in the cam roll 100 riding up on the cam rim 99 at one end of the latter. While cam roll 100 moves upon cam rim 99, the cam roll 98 moves along the cam path 111. During these movements of the cam rolls 98 and 100, the cam roll 102 is leaving the concentric surface 110 and emerging through a slot 112 to reach and ride upon a concentric surface 113 whereby the spider member 94 is rotated through a few degrees to cause lifting of the bladed bed 14 far enough to release the work 16 resting upon the work support 10. Since rolls 98 and 102 are engaged with surfaces 111 and 113, respectively, the rectangular spider member 94 is locked in the above-noted work releasing position of the bladed bed 14 until the cam disk 104 moves slightly beyond the position shown in Fig. 1, as will now be explained. While the cam roll 98 soon leaves the surface 111 in the further rotation of the disk 104, the spider member 94 remains locked against the weight effect of the bed 14 due to the engagement of the cam roll 100 with the cam rim 97 and of the cam roll 102 with the concentric cam surface 113. Continued counterclockwise rotation of the disk 104 results in release of the locking effect of the roll 102 while maintaining that of rolls 98 and 100 of the spider member 94. In the continuation of the rotation of the disk 104, the roll 102 passes into the slot 105 whereby the spider member 94 is again locked against movement in both directions, as shown in Fig. 1. On the next succeeding revolution of the cam disk 104 the bladed bed 14 is lifted to its full height and locked in such position. Subsequently it is lowered a few degrees and again locked (just as in the preceding rotation of the disk 104 the bladed member 14 was raised a few degrees from the work support 10 and locked) thus completing the cycle (involving two rotations of the disk 104) wherein the bladed bed 14 was caused to co-operate with the work support 10 and then return to inoperative position. The arrangement of cam roll member 94 and cam disk 104 is to secure intermittent rotative movement of the shaft 90 in a manner similar to the well-known Geneva movement. The described rotation of the shaft 90 effects rotation of a pinion 118, which is in mesh with the pinion 92 on the shaft 90, with the result that the shaft 50 is rotated at relatively high speed through 180° to swing the bladed member 14 downwardly into the position shown in Fig. 2 through the crank 52 and link or pitman 54. Following this downward movement of the bladed member 14 into co-operative relation with respect to the work support 10 there is a dwell, as already stated, during which the work support 10 moves to the right in Fig. 2, to secure operation of the blades 15 upon the work. After the dwell mentioned the bladed member 14 is raised to release the work to permit its being drawn over the work support 10 as a table 1 moves upwardly with the treated portion of the work engaged by the upper rounded edge of said table. The member 14 is locked in its work releasing position and is subsequently raised to its uppermost position where there is another dwell while the work support 10 moves to work receiving position.

Secured to the cam shaft 34, journaled at its ends in the opposite end frames of the machine and arranged to operate the work support 10, is a sprocket wheel 120 around which passes a sprocket chain 122 also engaged with a sprocket wheel 124 secured to the power shaft 72, the sprocket chain 122 then passing around an idler sprocket 126 freely rotatable on the shaft 50. By means of the sprocket wheels 120, 124, 126, and sprocket chain 122 the shaft 34 is continuously driven, it being noted, however, that the cam 32 on the shaft 34 is so shaped as to provide for the necessary dwell periods in the movements of the work support 10.

Secured to the shaft 28, journaled in the end frames of the machine, is a pinion 130 in mesh with a gear wheel 132 fixedly mounted upon a shaft 134 journaled similarly to shaft 28. Secured to the shaft 134 is a second gear wheel 136 which is arranged in mesh with a pinion 138 secured to a shaft 140 mounted in the end frames of the machine, the said shaft carrying a sprocket wheel 142 about which passes a sprocket chain 144, the latter also passing around a sprocket wheel 146 secured to the power shaft 72. It will be clear then that the shaft 28 is driven through a train of sprockets and gears from the power shaft 72. However, to provide for the proper dwell in the rotation of the shaft 28 (so that the table 1 in Fig. 2 may have time to ascend above and beyond the path of the gripper members 22, 23) the gear wheel 132 is provided with cut away portions in which are pivotally mounted segmental gear members 150, 152 each held yieldingly against a radially arranged surface of the gear wheel 132 by a spring 154. When in the rotation of the gear wheel 132, in the direction of the arrow in Fig. 1, the segmental tooth member 152 reaches the pinion 130 further rotation of the pinion 130 is delayed while the segmental tooth member 152 is being rotated against the tension of the spring 154 into contact with another radially arranged face on the gear wheel 132. Then rotation of the pinion 130 is again effected in the further continued rotation of said gear wheel 132. This dwell in the rotation of the shaft 28 is long enough to permit the table 1 in Fig. 2 to pick up the work 16 and pass out of the path of the gripper members 20, 23. It is to be noted in this connection that the ratio of teeth on the gear wheel 132 with respect to the teeth on the pinion 130 is such that only one of the segmental gear members 150, 152 becomes operative in connection with the pinion 130 in any given period during which a table engages a piece of work and carries it upwardly away from the work support 10. In the described arrangement the shafts 28, 34, and 50 each make a complete revolution while shaft 72 is making two revolutions.

In operating the illustrated machine, a piece of work, such as a hide or skin 16, is placed over the work support 10 and gripper member 18 while the said parts are in work receiving position, as indicated in Fig. 1. It will be understood that the hide or skin is positioned in such manner that the backbone portions thereof rest upon the work support 10 with the backbone line extended along the median longitudinal line of the work supporting surface and in substantial parallelism with the adjacent longitudinally extending edge of the gripper member 18. Upon starting the machine the work support 10 and gripper member 18 are moved in a clockwise direction about the axis 12 and then, early in this movement but after the closure of the gripper 20, the bladed member 14 is brought into co-operative relation with respect to the work support 10, whereby the work is engaged by the blades 15 while it is backed by the arcuate work supporting surface of the work support 10. The bladed member 14 remains stationary, except for movements of adjustment to the thickness of the work, while the work support 10 and gripper members 18 and 20 move to effect operation of the blades upon the work. Shortly after the beginning of the movement of the work support 10 to the right in Fig. 1, the work gripping means comprising the gripper members 18 and 20 move away from the work support 10 to drag the work over the upper arcuate surface of the work support 10 and over the operative edges of the blades 15 while movement of the work support 10 continues as before, the result being that the work is maintained under tension during the operation of the blades 15 thereon and with the further result that due to the dragging of the work over the work support 10 a greater area is operated upon than would be the case if only that part of the work was operated upon which was initially placed upon the arcuate work supporting surface of the work support 10. Toward the end of the movement of the gripping means toward the right in Figs. 1 and 2, the treated portion of the piece of work is carried across the plane which corresponds to the vertical portion of the path of the tables 1, the gripping means finally releasing the work just before it is engaged by the upwardly moving table 1 in Fig. 2. Therefore, when the table 1 shown in the lower part of Fig. 1 rises a little above the position shown in Fig. 2 it picks up the piece of work by contact with a portion which has just been thoroughly operated upon by the putting-out blades 15 carried by the bladed member 14. Hence, when the table moves further in the upward direction and passes between and beyond the bladed cylinders 3 and the bladed beds 7, the putting-out operation is completed through putting-out operations on those portions of the work backed by the oppositely facing surfaces of the table. It is clear, therefore, that upon once passing a piece of work through this machine, all portions thereof will be found to have received thorough treatment. Following operation upon one piece of the work the work support 10 and the gripping means 18, 20 are returned to work receiving position shown in Fig. 1 preparatory to a repetition of the described operations upon a fresh piece of work. The conveyors 70 with their tables 1, run continuously at a speed which experience has shown to be practical, the operator having allotted time no more than is sufficient to enable him to introduce a fresh piece of work on the work support 10 each time that it moves to work receiving position. hTe treated work is removed by a boy at the back of the machine.

Having described my invention, what I claim as new and desire to secure by Letters Patent of the United States is:

1. In a machine for operating upon hides, skins, and pieces of leather, a bed or plate member having blades, a work support arranged for co-operation with said blades in treating a central longitudinal portion of a piece of work, and means for treating the remaining portions of the piece of work comprising a table arranged to receive the work from said work support and present it to said treating means.

2. In a machine for operating upon hides, skins, and pieces of leather, work treating means, a table having a curved edge portion and operative to present a piece of work to the work treating means, a bed or plate member having blades, and a work support, said bladed member and work support co-operating to treat a central longitudinal portion of the piece of work and to position the treated portion for engagement by the curved edge of the table movable to present the work to said work treating means.

3. In a machine for operating upon hides, skins, and pieces of leather, work treating means, a table having a curved edge portion and operative to present a piece of work to the work treating means, a bladed bed for operating on a piece of work, a work support, said work support and bladed member being relatively movable to treat a central longitudinal portion of a piece of work, and a gripper operative, in conjunction with the work support, to hold the piece of work for treatment by the bladed member, and means to move the gripper relatively to the work support to position the work for engagement by said table.

4. In a machine for operating upon hides, skins, and pieces of leather, a bladed member, a work support movable in a direction transverse of the blades of the bladed member in operating on a portion of a piece of work, a work gripper movable with the work support to hold the work for treatment by the bladed member, means for treating another portion of the work, and means to receive the work from said work support and present it to said work treating means.

5. In a machine for operating upon hides, skins, and pieces of leather, a member having blades for operating on a piece of work, a work support having a surface to support the work against the thrust of the blades, a work gripper, means to move the work support and the gripper simultaneously in a direction to drag the work over the operative edges of said blades to secure treatment of a portion of the work, means to treat another portion of the work, and means to present the work to said work treating means, said gripper being operative to position the work for engagement by said work presenting means.

6. In a machine for operating upon hides, skins, and pieces of leather, a bed member having blades to operate on a piece of work, a work support having a work supporting surface to present the work to the operative edges of said blades, said bed member and work support being relatively movable alternately to receive and to operate upon a portion of the work, a work gripper movable with the work support and also away therefrom to drag the work over the surface of the work support during treatment thereof by said blades, means to treat another portion of the work, and means to transfer the work from said gripper to said work treating means.

7. In a machine for operating upon hides, skins, and pieces of leather, means for treating a piece of work, a table movable to present the piece of work to the treating means, a member provided with a plurality of blades, a work support having a surface for co-operation with the blades in operating on a piece of work, and means to move the piece of work over the surface of the work support, said means serving also to position the work for engagement by said table.

8. In a machine for operating upon hides, skins, and pieces of leather, means for treating a piece of work, means to present the piece of work to the treating means, a member provided with a plurality of blades, a work support for presenting the piece of work to the blades, said bladed member and work support being relatively movable to engage and treat the work after the latter has been placed on the work support, and a work gripping means movable during treatment of the work to position the work for engagement by said work presenting means.

9. In a machine for operating upon hides, skins, and pieces of leather, means for treating a piece of work, means including a table to present the piece of work to the treating means, a member provided with a plurality of blades, a work support for presenting the piece of work to the blades, said bladed member and work support being relatively movable to engage and treat the work after the latter has been placed on the work support, and a work gripping means movable to pull the work over the surface of the work support during treatment thereof and to position the work for engagement by said table.

10. In a machine for operating upon hides, skins, and pieces of leather, means for treating a piece of work, a table movable to present the piece of work to the treating means, a member provided with a plurality of blades, a work support having a surface for co-operation with the blades in operating on a piece of work, a work gripper, and means to move the work support and the gripper simultaneously in a direction to draw the piece of work past the bladed member while the blades are engaged with the work whereby the portion of the work being operated upon is maintained in taut condition during the operation of the blades thereon, said table being also operative to pick up the work piece after treatment by said blades preliminarily to presenting it to said work treating means.

11. In a machine for operating upon hides, skins, and pieces of leather, means for treating a piece of work, a table movable to present the piece of work to the treating means, a member provided with a plurality of blades, a work support having a surface for co-operation with the blades in operating on a piece of work, a work gripper, and means to move the work support and the gripper simultaneously in a direction to cause operation of the blades upon the work, said means being also operative to move the gripper relatively to the work support to position the work for engagement by said table.

12. In a machine for operating upon hides, skins, and pieces of leather, means for treating a piece of work, a table movable to present the piece of work to the treating means, a member provided with a plurality of blades, a work support having a surface for co-operation with the blades in operating on a piece of work, work gripper members, said work support and said gripper members being movable to work receiving position with the gripper members open to receive the work, means to move the work support and the gripper members simultaneously to cause movement of the work relative to said blades, said means being operable also to effect closing of the gripper members and movement thereof relative to the work support whereby the work is held in taut condition during operation of the blades thereon, and said gripper members and work support being operative to place the work piece in position to be engaged by said table during movement of the latter to present said work piece to said work treating means.

13. In a machine for operating upon hides, skins, and pieces of leather, means for treating a piece of work, a table movable to present the piece of work to the treating means, a member provided with a plurality of blades, a work support having a surface for co-operation with the blades in operating on a piece of work, work gripper members, said work support and said gripper members being movable to work receiving position with the gripper members open to receive the work, means to move the work support to cause operation of the blades upon the work, and means to move the gripper members to drag the work over the surface of the work support while the blades are operating thereon, said table being also operative to pick up the work piece after treatment by said blades preliminarily to presenting it to said work treating means.

14. In a machine for operating upon hides, skins, and pieces of leather, means for treating a piece of work, a table movable to present the piece of work to the treating means, a member provided with a plurality of blades, a work support having a surface for co-operation with the blades in operating on a piece of work, work gripper members, said work support and said gripper members being movable to work receiving position with the gripper members open to receive the work, means to move the work support to cause operation of the blades upon the work, and means to move the gripper members relatively to the work support to position the work for engagement by the table moving upwardly between the work support and gripper members.

15. In a machine for operating upon hides, skins, and pieces of leather, means for treating a piece of work, a table movable to present the piece of work to the treating means, a member provided with a plurality of blades, a work support having a surface for co-operation with the blades in operating on a piece of work, means to move the bladed member and the work support away from each other and the work support to work receiving position, means to move the bladed member and work support into co-operative relation with respect to each other, and a gripper to take hold of the work and movable to tension the work while it is being operated upon by the bladed member, said table being also operative to pick up the work piece after treatment by said blades preliminarily to presenting it to said work treating means.

16. In a machine for operating upon hides, skins, and pieces of leather, means for treating a piece of work, a table movable to present the piece of work to the treating means, a member provided with a plurality of blades, a work support having a surface for co-operation with the blades in operating on a piece of work, means to move the bladed member and the work support away from each other and the work support to work receiving position, means to move the bladed member and work support into co-operative relation with respect to each other, and a gripper to take hold of the work and movable to position the work for engagement by the table as the latter moves toward said work treating means.

17. In a machine for operating upon hides, skins, and pieces of leather, means for treating a piece of work, a table movable to present the piece of work to the treating means, a member provided with a plurality of blades, a work support having a surface for co-operation with the blades in operating on a piece of work, a work gripper, means to move the work support and the gripper relatively to said bladed member to cause operation of the blades upon the work supported by the work support, and means to move the gripper to carry a portion of the work transversely across the path of movement of said table whereby the table may engage the work on its movement toward said work treating means.

18. In a machine for operating upon hides, skins, and pieces of leather, work treating means, a table movable in a vertical plane to present a piece of work to the work treating means, a bladed member, a work support for co-operation with the bladed member, and a work gripper for moving a portion of the work over the surface of the work support and transversely across said vertical plane to position the work in the path of the vertically movable table.

19. In a machine for operating upon hides, skins, and pieces of leather, work treating means, a table movable in a vertical plane to present a piece of work to the work treating means, a bladed member, a work support for co-operation with the bladed member, a stop positioned in a vertical plane at one side of the path of the table, means to move the work support relatively to the bladed member and into contact with said stop, a work gripper movable to drag the work over the surface of the work support, and means to move the gripper beyond said stop and transversely across said vertical plane to position a portion of the work in the path of said vertically movable table.

20. In a machine for operating upon hides, skins, and pieces of leather, a bed plate having blades for operating on a piece of work, said bed plate and blades being stationary during treatment of the work, a work support having a surface to support the work against the thrust of the blades, means to move the bed plate and blades away from the work support to permit positioning of the work on the work support, said means also serving to move the bed plate and blades into cooperative relation to the work support, a gripper to take hold of the work, and means to move the work support and the gripper simultaneously in a direction to drag the work over the operative edges of said blades.

21. In a machine for operating upon hides, skins, and pieces of leather, a member having blades for operating on a piece of work, a work support having a surface to support the work against the thrust of the blades, a gripper to take hold of the work, and means to move the work support and the gripper simultaneously in a direction to drag the work over the operative edges of said blades, and to cause movement of the gripper away from the work support to drag the work over the surface of the latter while the blades are still in contact with the work.

22. In a machine for operating upon hides, skins, and pieces of leather, a member having blades for operating on a piece of work, a work support having a surface to support the work against the thrust of the blades, said bladed member and said work support being relatively movable alternately from and toward each other to receive the piece of work and to operate on the same, a gripper to take hold of the work and movable to receive and to engage the work when the latter is placed on the work support, and means to move the gripper away from the work support to drag the work over the surface of the work support while the blades are operating thereon.

23. In a machine for operating upon hides, skins, and pieces of leather, a bladed member and a work support relatively movable from and toward each other to receive the work and subsequently to engage the work for operation of the blades thereon, work gripper members movable with the work support to work receiving position with the gripper members spaced from each other to receive the work, and means to move the work gripper members relatively to the work support to tension the work while it is being operated upon by the blades of the bladed member.

24. In a machine for operating upon hides, skins, and pieces of leather, a bladed member and a work support relatively movable from and toward each other to receive the work and subsequently to engage the work for operation of the blades thereon, work gripper members movable with the work support to work receiving position with the gripper members open to receive the work, and means to move the work support and gripper members simultaneously with respect to the bladed member to cause operation of the blades on the work, said means being operable also to move the work gripper members relatively to the work support to drag the work over the surface of the work support, whereby the gripper members and the work support cooperate to enlarge the area operated upon by the bladed member over that effected solely by movement of the work support relatively to the bladed member.

25. In a machine for operating upon hides, skins, and pieces of leather, a member having blades for operating on a piece of work, a work support having a surface to support the work against the thrust of the blades, said bladed member and said work support being pivotally mounted, means for swinging the bladed member in an upward direction and the work support in a downward direction, thus positioning them for reception of a piece of work, said means being operable to swing the bladed member and the work support in reverse directions to cause engagement with the work on the work support, work gripper members movable with the work support to work receiving position and into spaced relation with each other to receive the work, and means to move the gripper members toward each other to engage the work and then away from the work support to drag the work over the surface of the work support while the blades are operating thereon.

26. In a machine for operating upon hides, skins, and pieces of leather, a bladed member and a work support both pivotally mounted for movement away from each other to receive the work, said bladed member subsequently moving toward the work support to engage the work for operation of the blades thereon, work gripper members movable to work receiving position with the gripper members open to receive the work, said gripper members subsequently closing to engage the work, and means to move the work support and gripper members simultaneously with respect to the bladed member to cause operation of the blades on the work, said means being operable also to move the gripper members relatively to the work support to drag the work over the surface of the latter.

27. In a machine for operating upon hides, skins, and pieces of leather, an arcuate member having blades upon its concave surface and pivotally mounted in the frame of the machine, a work support also pivotally mounted and having an arcuate surface for cooperation with said blades, means for causing relative swinging movements of the bladed member and the work support from and toward each other alternately to receive the work and to engage therewith, work gripper members movable with the work support to work receiving position with the gripper members open to receive the work, means to swing the work support and the work gripper members in a direction to cause the blades to operate on the work, and means to move the gripper members away from the work support to tension the work while it is being operated upon by said blades.

HARRIE A. BALLARD.